United States Patent Office 3,030,267
Patented Apr. 17, 1962

3,030,267
PROCESS AND COMPOSITION FOR ATTRACTING AND COMBATTING INSECTS, IN PARTICULAR THE MEDITERRANEAN FRUIT FLY
Alfred Margot, Basel, Switzerland, assignor to J. R. Geigy A.-G., Basel, Switzerland
No Drawing. Filed July 29, 1960, Ser. No. 46,067
Claims priority, application Switzerland July 31, 1959
10 Claims. (Cl. 167—48)

The present invention concerns a process for attracting and combatting insects, in particular the Mediterranean fruit fly (*Ceratitis capitata*), as well as compositions having a content of attractants and insecticides in order to simultaneously attract and combat insects.

Recently attractants have become of particular interest in insect control. The purpose of attractants is to attract injurious insects to certain places in an area infested therewith in order to combat or eliminate them there.

By the term insect attractants, those active substances are meant which cause the insects to move in the direction of the place from which the attraction springs. This means that the attractants must be effective at some distance. They are not the objective for which the insect is searching but signposts in the search for the objective which can be either food, a mate or a place in which to lay eggs.

An insect attractant can have two main objects: namely to determine whether a species of insects is present in a certain area and to control the attracted insects, for example, in combination with a poison or in another manner. An insect attractant should remain active for a long period and, in order to attain the first object, it should be as specific as possible for a species of insects.

The insect attractants known up to the present fall into two groups: native, i.e. produced by the insect itself and alien, natural or synthetic attractants. In nature, principally native sexual attractants play a great part with insects. They are formed generally by the females in certain glands and attract the males.

Empiraclly found, however, as sexual attractants for male insects are also alien organic substances. Thus, for example, caproic acid is an intensive attractant for male Pacific Coast wire worms (*Limonius canus*). Methyl eugenol is the most active attractant known for the Oriental fruit fly (*Dacus dorsalis*). 2-allyloxy-3-ethoxybenz-aldehyde attracts both sexes of this species of insect, whereas aromatic compounds containing methoxy groups, in particular the alkoxybenzene derivatives, mainly attract the male Dacus flies. Anisyl acetone is a strong attractant for male melon flies (*Dacus cucurbitae*), the butanone side chain in which is decisive for the attractant action.

The insect which has become most injurious in practice in tropical and subtropical areas is the Mediterranean fruit fly (*Ceratitis capitata*) which annually causes many million francs' worth of damage to cultivated plants. Originally, angelica seed oil was used to combat this pest. The active substance of the oil is probably a sesquiterpene and the oil is an attractant for the Mediterranean fruit fly. As the annual production of angelica seed oil is relatively slight and the price of the oil is very high, attempts have been made to find a synthetic attractant for the Mediterranean fruit fly. Gertler, in U.S. Patent No. 2,851,392, has described esters of 6-methyl-cyclohexene-(3)-carboxylic acid-(1) as good attractants for the Mediterranean fruit fly, particularly for the males.

To effectively control the Mediterranean fruit fly it is necessary to determine the area infested and the extent of the infestation. This can be done in areas suspected of infestation by setting traps with an attractant. Advantageously the attractant can be combined with an insecticide which kills the flies. A count of the flies caught or killed gives an idea of the extent of infestation of a given area.

According to the invention, it has now surprisingly been found that easily accessible benzene sulphenamides of the general formula

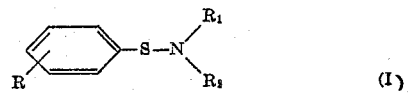

(I)

wherein
R represents hydrogen, a halogen atom, especially chlorine or a low molecular alkyl, alkoxy or alkylmercapto group; preferably the radical R is a methyl group, a chlorine atom or hydrogen,
$R_1$ represents hydrogen or a low molecular alkyl or alkenyl group, especially the methyl, ethyl, n-propyl and allyl group, and
$R_2$ represents a low molecular alkyl or alkenyl group, especially the methyl, ethyl, n-propyl and allyl group, have an excellent attractant action on the Mediterranean fruit fly and can be used, advantageously in combination with an agent for insect control, e.g. with insect traps or insecticidal active substances and, possibly, foodstuffs, for the effective control of this species of insects.

Those compounds of the general Formula I in which both radicals $R_1$ and $R_2$ are identical low molecular alkyl and alkenyl groups especially methyl, ethyl, n-propyl and allyl groups, have proved to be particularly suitable attractants. Some of the compounds of the general Formula I are known substances or substances which can be produced by methods known per se.

The compounds of the general Formula I can be produced by known methods, for example, by converting a possibly suitably substituted thiophenol with chlorine into the corresponding benzene sulphenyl chloride (phenyl sulphur chloride) and reacting the latter with a primary or secondary low molecular alkyl or alkenyl amine. Thiophenol, however, can also be converted with thiocyanogen into the corresponding phenyl sulphur theocyanate and this then reacted with one of the cited amines.

The following compounds of the general Formula I have proved to be particularly suitable attractants:

Benzene sulphene-N,N-dimethylamide,
Benzene sulphene-N,N-diethylamide,
Benzene sulphene-N,N-di-n-propylamide,
Benzene sulphene-N,N-diallylamide,
p-Chlorobenzene sulphene-N,N-dimethylamide,
p-Chlorobenzene sulphene-N,N-diethylamide,
p-Toluene sulphene-N,N-dimethylamide,
o-Toluene sulphene-N,N-dimethylamide,
p-Toluene sulphene-N,methyl-N-ethylamide.

To determine the attractant action of the attractants used according to the present invention, 1 mg. of each active substance (0.1 ccm. 1% acetone solution) is put onto a round filter paper and after the acetone has evaporated, it is put into a cage occupied by fully developed Mediterranean fruit flies. The number of flies sitting on the filter papers is counted after 3, 5, and 10 minutes.

In the following table, the results obtained are given as the average of three tests:

| compound | 3' | 5' | 10' |
|---|---|---|---|
| benzene sulphene-N, N-dimethylamide | 14 | 13 | 11 |
| benzene sulphene-N, N-diethylamide | 18 | 23 | 30 |
| p-chlorobenzene sulphene-N, N-diemthyl-amide | 40 | 41 | 45 |
| p-toluene sulphene-N, N-dimethylamide | 59 | 60 | 60 |
| filter without active substance | 0 | 5 | 3 | p-Toluene sulphene-N,N-dimethylamide and p-chlorobenzene sulphene-N,N-dimethylamide have the best attraction power among the above cited test compounds of general Formula I.

The active ingredients of the general Formula I can be used to attract and control Mediterranean fruit flies in various ways. Advantageously the attractants are used combined with insecticidal poisons, the insecticide and attractant being used either separately or mixed. 1-isopropyl-3-methylpyrazolyl-(5)-dimethyl carbamate (Isolan), 1-phenyl-3-methylpyrazolyl-(5)-dimethyl carbamate (Pyrolan), 2-dimethylcarbamyl - 3 - methylpyrazolyl-(5)-dimethyl carbamate (Dimetilan), O,O-diethyl-O-(2-isopropyl-4-methylpyrimidyl - (6)) - thiophosphate (Diazinon), O,O-dimethyl - S - (1,2-bis-carbethoxyethyl)-dithiophosphate (Malathion), O,O-diethyl-O-(p-nitrophenyl)-thiophosphate (Parathion), O,O-dimethyl-1-hydroxy-2,2,2-trichlorethyl phosphonate (Dipterex), 2,2-dichlorovinyl-dimethylphosphate (DDVP), dimethyl - 1 - methoxy-2,2-dichlorovinyl phosphate (Chlorophan), 1,1,1-trichloro-2,2,2-bis-(p-chlorophenyl)-ethane (DDT), isobornyl thiocyanoacetate (Thanite), 2-(2-butoxyethoxy)-ethyl thiocyanate (Lethane 384) have proved to be particularly suitable insecticides for the control of Mediterranean fruit flies.

The agents for attracting and controlling Mediterranean fruit flies according to the invention can be used as such or as emulsions, suspensions, dusts or sprinkling agents or as other types of preparations, for example, window putty, etc. The choice of preparation depends on the intended method of application which, in its turn, depends on the type of plants to be protected and the technical application conditions. Thus, for example, in certain traps, bait trees or parts of a cultivated plant, a limited application is possible which enables sufficient protection to be attained while using a reduced amount of poison, this, possibly, without damaging the part of the plant and fruit to be enjoyed, by insecticides.

Dusts and sprinkling agents according to the invention can be produced, for example, by mixing or milling together the active substances with a solid, pulverulent carrier. Talcum, diatomaceous earth, kieselguhr, kaolin, bentonite, calcium carbonate, boric acid, tricalcium phosphate, oyster shells, sawdust or powdered cork for example are suitable as carriers.

For the preparation of emulsions, in practice it is generally advantageous first to produce concentrates by combining solid or liquid active ingredients with inert organic solvents and/or capillary active substances. These are monophase or polyphase systems and, with water, can be made into ready-for-use emulsions. Capillary active substances which can be used are both cation active, e.g. quaternary ammonium salts, and anion active such as e.g. salts of aliphatic long chain sulphuric acid monoesters, long chain alkoxyacetic acids and aliphatic-aromatic sulphonic acids. Non-ionogenic capillary active substances which can be used are e.g. polyethylene glycol ethers of fatty alcohols or dialkyl phenols and polycondensation products of ethylene oxide. Cyclic hydrocarbons such as benzene, toluene, xylene, as well as ketones, alcohols and other solvents such as e.g. ethyl acetate, dioxan, acetone glycerine or diacetone alcohol are suitable as solvents for the preparation of emulsion concentrates.

Wettable powders suitable for suspension in water, so-called spray powders, can be produced by combining liquid active ingredients with solid pulverulent carriers and capillary active substances.

Preparations of the attractant with putty have proved to be agents with particularly good duration of action, to produce which the active substance is mixed with the putty.

Suitable preparations of the active substances can also be used on wood or glass sheets, on paper, foam rubber, gauze or cords or flexes as baits.

It has also been found that the combination of the attractants with vivid yellow colours increases the attractant action.

The following examples further describe the test methods used to determine the activity of the attractants used according to the invention as well as the application forms thereof.

Example 1

Bean plants are treated with 1% suspensions (produced from wettable powder) or 1% emulsions which contain p-chlorobenzene sulphene-N,N-dimethylamide as attractant and the plants are placed in fly cages.

It can be determined that within 15 minutes 5 times more flies are attracted to the plants treated with suspensions or emulsions than are attracted to the untreated plants.

A stock emulsion suitable for dilution with water is obtained for example by dissolving 20 parts by weight of active substance in 70 parts by weight of xylene and adding 10 parts by weight of a suitable emulsifying agent, e.g. a reaction product of octyl phenol with ethylene oxide.

Example 2

1 g. of putty containing 1% of p-chlorobenzene sulphene-N,N-dimethylamide is placed in the centre of numerous leaves forming the crown of a bean plant. The plant is placed in a fly cage and the number of flies attracted to or resting on the plant is counted. Compared with bean plants not treated with attractant, it can be determined that 10 times more Mediterranean fruit flies are found on bean plants treated with a putty bait.

Example 3

To determine the distant attraction, 300 Mediterranean fruit flies are released in a 20 m.$^3$ room with artificial daylight lighting. As baits, 5 g. of wool fat and 5 g. of putty each containing 5% of p-chlorobenzene sulphene-N,N-dimethylamide are exposed on a horizontal piece of wood measuring 25 x 25 cm. placed equidistant from the floor and ceiling. Wool fat and putty not containing active ingredient were also placed on the wood. The baits containing attractants attracted 10–40 times more flies than the others.

The distant attraction of p-chlorobenzene sulphene-N,N-dimethylamide can be further increased by combining the agent used with vivid yellow colours.

Example 4

An emulsion concentrate of an attractant, e.g. p-toluene sulphene dimethylamide, is made up into a wool fat paste containing 5% attractant. A 5 cm. broad ring of this paste is put around the trunk of a fruit tree and the tree is sprayed with a 0.5% suspension of Diazinon. 10–25 trees in an area of 1 hectare are treated in the same way.

Example 5

Little yellow coloured gauze sacks are dipped in a solution containing 1% of insecticide and then filled with earth which has been saturated with an emulsion of the attractant, e.g. benzene sulphene-N,N-diethylamide. These sacks are attached at easily visible places to the trees to be protected.

What I claim is:

1. A method of detecting infestations of the Mediterranean fruit fly which comprises using as attractant for the flies a benzene sulphenamide of the general formula

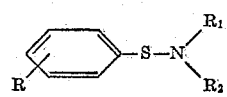

wherein R represents a member selected from the group consisting of the hydrogen atom, the chlorine atom and the methyl radical, and $R_1$ and $R_2$ independently in each occurrence represent a member selected from the group consisting of a low molecular alkyl radical and the allyl radical.

2. A method of controlling infestations of the Mediterranean fruit fly which comprises baiting a trap with an attractant comprising a benzene sulphenamide of the general formula

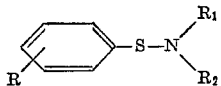

wherein R represents a member selected from the group consisting of the hydrogen atom, the chlorine atom and the methyl radical, and $R_1$ and $R_2$ independently in each occurrence represent a member selected from the group consisting of a low molecular alkyl radical and the allyl radical.

3. The method of claim 2 wherein the benzene sulphenamide is mixed with a toxicant for the Mediterranean fruit fly.

4. The method of claim 3 wherein the attractant is p-toluene sulphene-N,N-dimethylamide.

5. The method of claim 3 wherein the attractant is p-chlorobenzene sulphene-N,N-dimethylamide.

6. The method of claim 3 wherein the attractant is benzene sulphene-N,N-diethylamide.

7. A composition for controlling the Mediterranean fruit fly comprising a toxicant and an attractant having the general formula

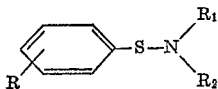

wherein R represents a member selected from the group consisting of the hydrogen atom, the chlorine atom and the methyl radical, and $R_1$ and $R_2$ independently in each occurrence represent a member selected from the group consisting of a low molecular alkyl radical and the allyl radical.

8. The composition of claim 7 wherein the attractant is p-toluene sulphene-N,N-dimethylamide.

9. The composition of claim 7 wherein the attractant is p-chlorobenzene sulphene-N,N-dimethylamide.

10. The composition of claim 7 wherein the attractant is benzene sulphene-N,N-diethylamide.

References Cited in the file of this patent
UNITED STATES PATENTS

| | | |
|---|---|---|
| 2,560,531 | Kipnis | July 17, 1951 |
| 2,851,392 | Gertler | Sept. 9, 1958 |